July 25, 1944.   B. M. BECKER   2,354,640
REACTOR TUBE
Filed Feb. 11, 1942

INVENTOR
BERNARD M. BECKER
BY
ATTORNEY

Patented July 25, 1944

2,354,640

UNITED STATES PATENT OFFICE 2,354,640

REACTOR TUBE

Bernard M. Becker, Chicago, Ill., assignor to Universal Oil Products Company, Chicago, Ill., a corporation of Delaware Application February 11, 1942, Serial No. 430,509

6 Claims. (Cl. 23—288)

The invention relates to a reactor adapted to use in conducting reactions of the type employing a bed of solid granular contact material, reagent or catalyst and is more particularly directed to an improved form of tubular element for use in reactors of this general class.

In the dehydrogenation of butanes to butylenes and in the dehydrogenation of butanes and/or butylenes to butadiene, low operating pressures are required. This is also true of many other chemical reactions employing a catalyst or a mass of contact material for increasing intimacy of contact between the reactants. For this reason, low pressure drop through the reactor is essential since it represents a much greater percentage of the desired operating pressure than when operating pressures of a high order are employed. In such operations employing one or more beds of granular contact material or catalyst through which the reactants and resulting conversion products are passed, a major portion of the pressure drop or differential in pressure between the inlet and outlet of the reactor is due to the resistance to flow offered by the bed of contact material.

One of the primary purposes of the present invention is to provide an improved tubular reactor in which relatively low pressure drop is encountered from the inlet to the outlet thereof. This is accomplished by providing elongated inlet and outlet conduits positioned within the tubular member wherein the catalyst or contact material is disposed, with provision for directing the reactants from the inlet conduit, at a multiplicity of points along its length, into the catalyst bed through which they flow about the inlet and outlet conduits and wherefrom resulting fluid reactants pass into the outlet conduit at a multiplicity of points along its length to be discharged therefrom and from the reactor. This general form of reactor tube is disclosed in J. W. McCausland Patent Number 2,252,719 and the present invention is directed to an improvement in this type of apparatus.

In reactor tubes of the general type above mentioned and to which the present invention is addressed, the incoming reactants and outgoing reaction products flow in parallel paths within the inlet and outlet conduits which distribute the reactants to the bed of catalyst or contact material and collect the reaction products therefrom. Many reactions in which this type of apparatus may be employed to advantage are strongly endothermic or strongly exothermic, the former necessitating that the reactants be supplied to the catalyst bed in heated state and the latter resulting in a higher temperature in the stream of outgoing reaction products than that in the stream of incoming reactants. In the absence of provisions to the contrary, heat is therefore transferred from the incoming to the outgoing stream or vice versa and from the incoming or outgoing stream to the bed of catalyst or contact material. This results in the prevalence of non-uniform temperatures throughout the length of the reactor tube and the catalyst bed disposed therein and is particularly objectionable when, as is usually the case, the optimum reaction temperature is rather critical.

As a special feature of the invention to overcome the aforementioned difficulty, I provide a sheath surrounding the inlet and outlet conduits with heat-insulating material disposed therein to obviate or materially reduce the transfer of heat between the inlet and outlet conduits themselves and also between said conduits and the bed of catalyst or contact material.

Other features and advantages of the invention will be apparent from an inspection of the accompanying diagrammatic drawing and from the following description thereof.

In the drawing

Figure 1:
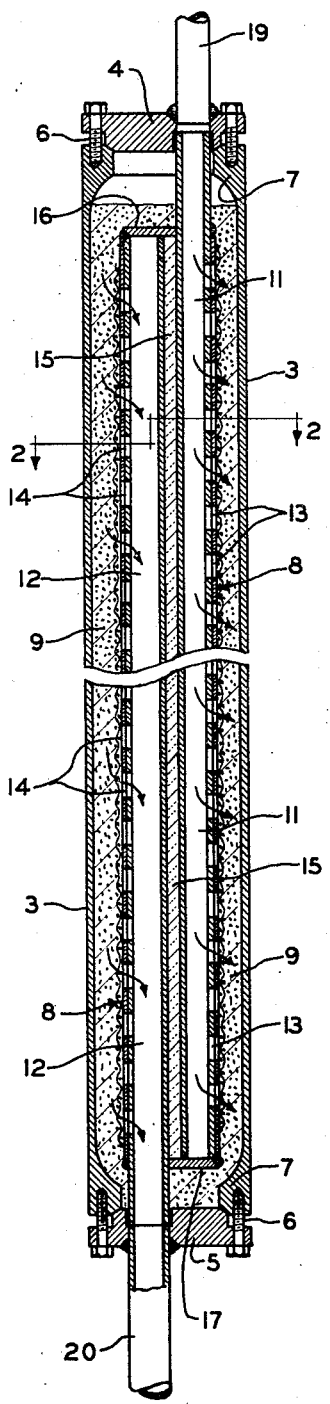
Figure 1 illustrates one specific form of the reactor tube provided by the invention and it is here shown in longitudinal section.

Referring to the drawing, the outer tube of the assembly here illustrated comprises a pipe or cylindrical tube of suitable metal or metallic alloy and is closed at its opposite ends by the ground joint, flanged closure members 4 and 5, releasably secured to tube 3 by suitable bolts 6 threaded into a substantially ring-shaped inward protrusion 7 provided at each end of tube 3.

The core member 8 of the assembly is in the case here illustrated substantially concentric with tube 3 and spaced from the latter to provide an annular space therebetween within which the bed of solid granular catalyst or contact material 9 is disposed. The core 8 extends to adjacent the opposite ends of tube 3 and comprises an outer sheath 10 of suitable metal or metallic alloy (see Figure 2). Inlet conduit 11 and outlet conduit 12 disposed within the area enclosed by sheath 10 are located adjacent and secured to sheath 10 along diametrically opposite sides thereof by welding or in any other suitable manner. Spaced openings 13 are provided through conduit 11 and sheath 10 along their length at their line of juncture and similar spaced openings 14 are provided through conduit 12 and sheath 10 along their length at their line of juncture, the openings 13 and 14 being on opposite sides of the core assembly 8. It is, of course, within the scope of the invention to provide continuous longitudinal slots along the length of tubes or conduits 11 and 12 through their walls and through the wall of sheath 10 in place of the spaced openings 13 and 14, but for greater strength in the walls of these members the spaced openings are preferred. Suitable screens 18 may be provided, when desired, over openings 13 and 14, particularly when these openings are larger than the particle size of the catalyst or contact material, to prevent the latter from entering conduits 11 and 12.

Heat insulating material, indicated at 15, is provided within sheath 10 about the conduits 11 and 12 to insulate the conduits from each other and from the bed of catalyst or contact material 9. The insulation may comprise such materials as asbestos-magnesia, exfoliated vermiculite, slag wool, rock wool, glass wool and the like and may be selected to suit the temperature and other operating conditions to which it is subjected. It should be noted that the metal sheath 10 protects the insulation from contact with the catalyst, reactants and reaction products and that it is closed at its upper and lower ends by the members 16 and 17 which are welded or otherwise suitably secured thereto. Member 16 also closes the upper end of conduit 12 and member 17 closes the lower end of conduit 11.

Conduit 11 protrudes through closure member 16 at the upper end of the core assembly 8 and terminates in a port provided in the removable closure member 4 to communicate with an inlet line 19 through which reactants to be converted are supplied to the reactor tube. Similarly, conduit 12 protrudes through closure member 17 at the lower end of the core assembly 8 and terminates in a port provided in closure member 5 to communicate with an outlet line 20 through which fluid reaction products are discharged from the reactor tube. Preferably, conduits 11 and 12 are not permanently affixed to the respective closure members 4 and 5 but slip into the ports provided in the latter so that members 4 and 5 may be removed without removing the core assembly 8.

Figure 2:
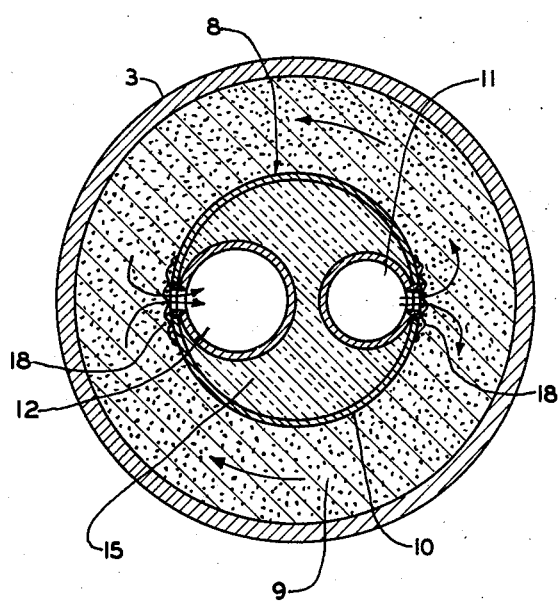
Figure 2 is a cross-sectional view of the same reactor tube taken along line 2—2 in Figure 1.

In operation, fluid reactants are supplied to conduit 11 through inlet line 19 and pass as a plurality of separate streams distributed along the length of conduit 11 through openings 13 into contact with the annular bed of catalyst or contact material 9 and the reactants and resulting fluid reaction products flow through this bed, as indicated by the arrows in Figure 2, and enter the outlet conduit 12 through the openings 14, to be discharged from the lower end thereof and from the reactor tube through outlet line 20. Obviously, the flow may be reversed, employing line 20 and conduit 12 for the introduction of reactants and conduit 11 and line 19 for the removal of reaction products. The relative size of conduits 11 and 12 may be proportioned to suit requirements, depending upon the temperatures and respective volumes of the incoming reactants and outgoing fluid reaction products.

In case it is desired to replenish the bed of catalyst or contact material 9, the upper closure member 4 may be unbolted and removed without disturbing the bed or the core assembly 8 and the additional catalyst or contact material may be introduced through the port provided at the upper end of tube 3 by removal of closure member 4.

When it is desired to remove and replace the bed of catalyst or contact material, closure members 4 and 5 are unbolted and removed and the catalyst or contact material allowed to drop from tube 3 through the port provided at the lower end thereof by removal of closure member 5. Closure member 5 may then be replaced and a bed of fresh catalyst or contact material built up within the reactor tube by introducing the same to the annular space between tube 3 and the core assembly 8 through the port at the upper end of tube 3. Closure member 4 may then be replaced and the apparatus conditioned for further use. In the apparatus illustrated core assembly 8 may be pulled from either the upper or the lower end of the reactor tube by first removing closure member 4 or closure member 5 and, of course, it may also be inserted from either end.

It will, of course, be understood that the drawing illustrates only one specific embodiment of the invention and that numerous modifications from the specific form illustrated will be apparent and are entirely within the scope of the invention. For example, the invention specifically contemplates the use of a plurality of reactor tubes such as herein provided, arranged and connected for the parallel flow of separate streams of reactants and resulting reaction products therethrough. This may be accomplished by connecting the inlet pipes 19 and the outlet pipes 20 from the several tubes to suitable inlet and outlet manifolds. On the other hand, the inwardly protruding portions 7 of tube 3 and the closure members 4 and 5 may be omitted and the tubes 3 rolled into, welded or otherwise secured to their opposite ends to tube sheets of a heat exchange type reactor through which suitable convective fluid is circulated about the exterior of tubes 3 to supply heat to or abstract heat from the beds of catalyst or contact material and the reactants and resulting conversion products flowing therethrough to assist in controlling the reaction temperature. When such temperature control is not required, a plurality of reactor tubes may be manifolded in either of the manners above mentioned to suitable inlet and outlet headers or compartments and these headers or compartments, as well as tubes 3, are preferably covered with suitable heat-insulating material.

I claim:

1. In an apparatus for obtaining contact between a stream of fluid and a porous mass of solid material, an elongated tubular member, a core member positioned longitudinally within said tubular member with a space provided therebetween for the reception of said mass, the core member comprising an outer metal sheath, a conduit within said sheath for distributing fluid to said mass, another conduit within said sheath for collecting fluid from said mass, heat-insulating material disposed within said sheath about said conduits, means providing communication between each of the conduits and the space between the tubular member and the core member, means for supplying fluid to said distributing conduit and means for removing fluid from said collecting conduit.

2. An apparatus such as defined in claim 1, wherein said distributing conduit comprises a tubular member disposed adjacent the wall of said sheath and wherein said collecting conduit comprises another tubular member spaced from the first named conduit and disposed adjacent the wall of said sheath.

3. An apparatus such as defined in claim 1, wherein said sheath comprises a tubular member substantially concentric with the first named tubular member.

4. An apparatus such as defined in claim 1, wherein said sheath comprises a tubular member and said distributing conduit comprises another tubular member disposed within and adjacent the wall of said sheath, said collecting conduit comprising another tubular member disposed within said sheath adjacent the wall thereof and spaced from said collecting conduit.

5. In an apparatus for obtaining contact between a stream of fluid and a porous mass of solid material, an elongated metallic tubular member, a metallic sheath disposed longitudinally within said tubular member with an annular space provided therebetween for the reception of said mass, a conduit for distributing fluid to said mass disposed within said sheath and substantially co-extensive therewith, a conduit for collecting fluid from said mass disposed within said sheath and substantially co-extensive therewith, heat-insulating material in said sheath between and about said conduits, said conduits being disposed adjacent diametrically opposite sides of said sheath and being provided with longitudinally disposed openings therethrough in registration with longitudinally disposed openings in the sheath, means for admitting fluid to said distributing conduit and means for directing fluid from said collecting conduit.

6. In an apparatus for obtaining contact between a stream of fluid and a porous mass of solid material, an elongated tubular member, a core member positioned within said tubular member to provide a space therebetween for the reception of said mass, an inlet conduit and an outlet conduit extending longitudinally of said core member, heat-insulating material between said conduits within the core member, and means providing communication between each of the conduits and the space between the core member and said tubular member.

BERNARD M. BECKER.